UNITED STATES PATENT OFFICE.

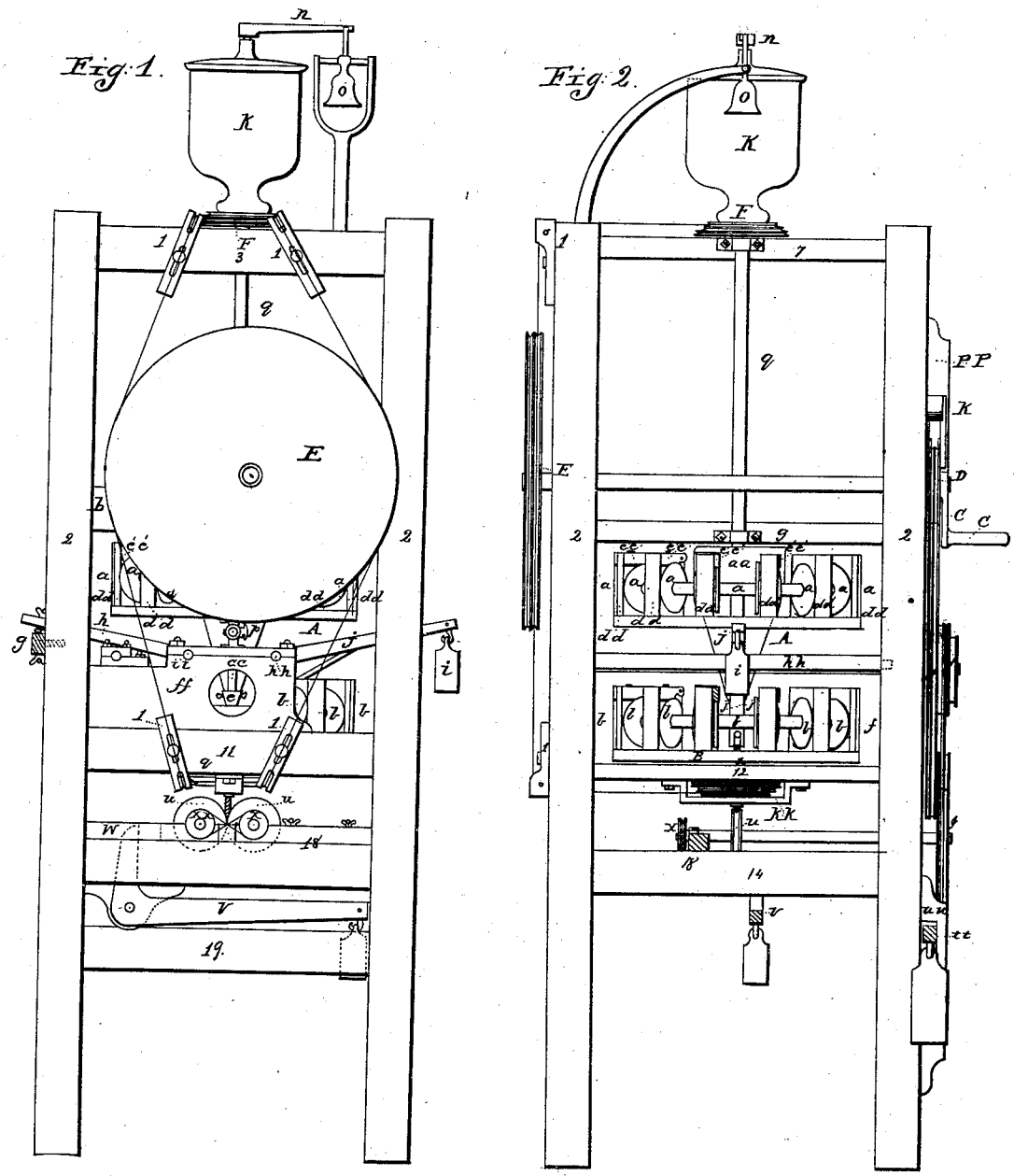

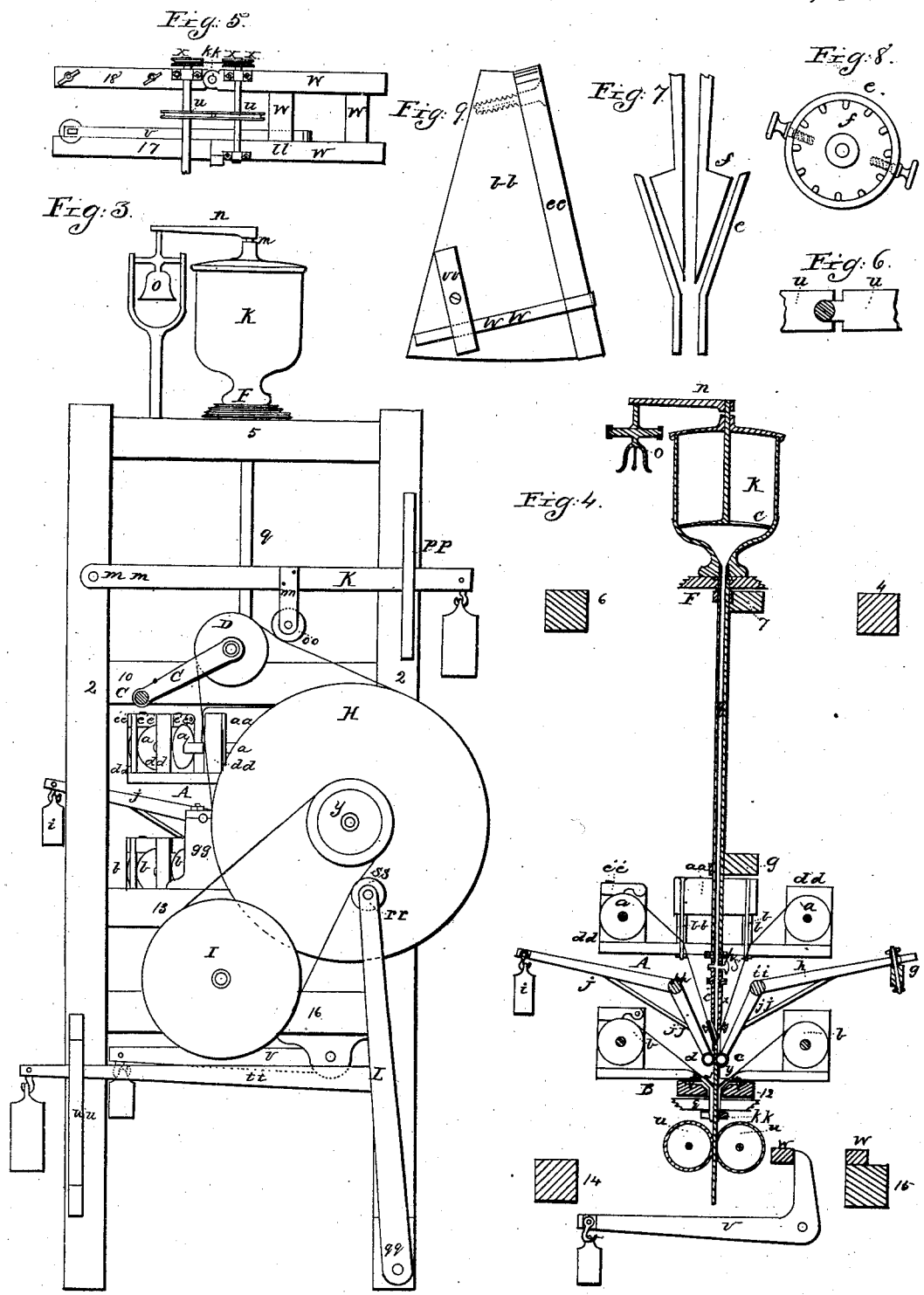

WM. LEWIS, OF NEW YORK, N. Y.

MACHINE FOR MAKING SAFETY-FUSES FOR CONVEYING FIRE IN BLASTING ROCKS, &c.

Specification of Letters Patent No. 991, dated October 26, 1838.

*To all whom it may concern:*

Be it known that I, WILLIAM LEWIS, of the city of New York, N. Y., have invented a new and useful Machine for Constructing Safety-Fuses or Fuses to Convey Fire in Blasting Rocks and other Substances; and I do hereby declare that the following is a full and exact description.

The nature of my invention consists in the combination of the reel frame A, Figures 1, 2, 3, and 4, described in the drawings to which this specification refers, and the reels $a$, $a$, $a$, $a$, &c., attached thereto and secured to the hollow shaft $q$, and revolving therewith, and in combining with them the cone $f$ and case $e$, either or both grooved, the whole operating for the purpose of spinning or forming the inner case of the fuse and filling the case with gunpowder. Also in the combination of the reel frame B with the reels $b$, $b$, $b$, $b$, &c., with the hollow shaft $z$, the upper end of which forms a seat or case to the cone $y$, which cone and seat either or both are grooved for guiding the threads, and forming the outer case of the safety fuse. Also in the application of the rollers grooved for the purpose of compressing the inner case of the fuse, and grooved rollers for the purpose of drawing off and determining the length of the fuse.

To enable others skilled in the art to make and use my invention I will proceed to describe its construction and operation.

The frame to carry the shafts, &c., shown throughout the drawings may be made of wood and of the following dimensions: 5 feet 8 inches in height and 21 inches clear width on each of its sides; it has four corner standards, as 2, 2, 2, 2, Figs. 1, 2, and 3 in the drawings. To these standards at the top are fixed 4 rails at No. 3, Fig. 1, Nos. 4 and 6, Fig. 4, and 5, Fig. 3, from 3 to 5 in Figs. 2 and 4, is fixed the bearer 7; at 19 inches lower down on the standards is fixed 2 rails as 8, Fig. 1, and 10, Fig. 3; from 8 to 10 is fixed the bearer 9, Figs. 2 and 4; at 18 inches lower down on the standards is fixed 2 rails, as 11, Fig. 1, and 13, Fig. 3; from 11 to 13 is fixed the bearer 12, Figs. 2 and 4; at 8 inches lower down on the standards is fixed 3 rails as 14, Fig. 2, and 14 and 15, Fig. 4, and 16, Fig. 3; from 14 to 15 is fixed 2 bearers as 17 and 18, Fig. 5, and 18, Figs. 2, 1, and 5. The rail 19, Fig. 1, is used merely to strengthen the frame. The hollow shaft $q$, Figs. 1, 2, 3, and 4, is made of wrought iron about an inch in diameter, and bored throughout and lined with brass the hole in the center of the brass is about ⅜ of an inch in diameter, the upper end of the shaft $q$. after passing through the pulley F. is made with a screw to enter the reservoir $k$ which screws down tight on the pulley F. Below on the shaft $q$, is fixed the circular block $a$ $a$, Figs. 2, 3, and 4; between this block and the frame A, Fig. 4, is placed 6 uprights. 2 only of these are shown in section and marked $b$ $b$, $b$ $b$. Through the block $a$ $a$, the uprights $b$ $b$, and frame A is passed 6 bolts about ¼ of an inch in diameter with nuts and screws to secure the frame A. To the flange on the lower end of $q$ is fastened by screws the stop cock $p$, Figs. 1 and 4; to the bottom of $p$ is fastened by flanges screwed together the hollow tube $c$ $c$, Figs. 1 and 4, on the end of $c$ $c$ is formed the grooved cone $f$, Figs. 4, 7, and 8, on the cone $f$ is fastened by screws the case $e$, Figs. 1, 4, 7, and 8 on the lower end of the case $e$ is formed a cylindrical tube, shown in section full size Fig. 7. The stop cock, the tube $c$ $c$, and the cone and case are made of brass. The circular frame A, Figs. 1, 2, 3 and 4, may be made of wood 18 inches in diameter and one inch thick. On this frame is raised 12 standards as $d$ $d$, $d$ $d$, etc., to carry the reels, $a$, $a$, $a$, $a$, etc. These reels are made of wood in the usual manner. A wooden drag as $e'$ $e'$, $e'$ $e'$, &c., Figs. 1, 2, 3, and 4, is held by a screw to each of the standards, its weight resting on the circular end of the reel. 12 holes must be cut through the frame A, Fig. 4, for the lines to pass from the reels $a$, $a$, &c., down to the cone $f$. These holes should be lined with metal to keep the wood from wear. The reservoir $k$, Figs. 1, 2, 3, and 4, is made of copper or brass in a circular form the upper part cylindrical and the lower part funnel shaped inside; to the top a cover is closely fitted, in the center of which a tube is fixed to steady the rod $m$. Connected to this rod is the plate $l$, Fig. 4. This plate is loosely fitted inside $k$. To the top of $m$ is fixed the arm $n$ sufficiently long to strike a bell so placed as to be struck by the arm $n$ when the plate $l$ is as low down as it can go in $k$. The shaft $q$ revolves in 2 pair of journal blocks, one pair of which is fixed on the bearer 7, Figs. 2 and 4; and the other pair on the bearer 9. On the nails 11 and 13, Figs. 1 and 3, are raised the blocks, $ff$, and $gg$, to carry the shafts, $hh$, and $ii$. One of these is shown in Fig. 2 and both in section Fig. 4. To the center of $ii$ is fastened the lever $h$, Figs. 1 and 4, projecting 2 or 3 inches beyond the frame of the machine, and having a mortise cut at the outer end to admit of a screw bolt passing through to adjust and to confine the lever $h$ to the bar $g$, Figs. 1 and 4, by means of nuts above and below the lever $h$ the bar $g$ being secured to the standards of the machine; to the shaft $hh$ is fastened the lever $j$, projecting 3 or 4 inches beyond the frame of the machine to carry the weight $i$, Figs. 1, 2, 3, and 4. To the shafts $hh$ and $ii$, Fig. 4, is fixed the rods $jj$, $jj$, each having a slot in the lower end to receive a brass friction roller, as shown in Fig. 4, marked $d$, $c$, and the edge of $d$ is seen in Fig. 2. These rollers are grooved on the edges according to section Fig. 6. The circular frame B, Figs. 2 and 4, with the standards, reels and drags are exactly like those of A, Figs. 1, 2, 3, and 4 and already described; in the center of frame B is a circular hole cut large enough to clear the threads from the reels $b$, $b$, $b$, &c., as they pass into the hollow shaft L, which is made of brass and bored out to let the fuse pass free. L is firmly screwed to the under side of B; the upper end of L is turned out to an angle of about 45 degrees and grooved to admit the threads from the reels $b$, $b$, $b$, &c., passing freely into the center of L; on the conical seat so formed in L the cone $y$, Fig. 4, is fitted. $y$ is bored vertically in its center to let the fuse pass free. The cone $y$ is held in its place by 2 screws tapped into L. The outside of L is turned and an iron or steel collar fitted thereto. This collar is screwed down to the bearer 12, Figs. 2 and 4. To the under side of 12 is fastened the hanging bracket $k$, $k$, having a hole for L to run in; in the space between the bearer 12 and the bracket $k$ $k$, on L, is fastened the pulley G, Figs. 1, 2, and 4. On the bearers 18 and 17, Fig. 5, 18, Figs. 1 and 5, is placed the frame $w$, Figs. 1, 4, and 5. This frame can be moved on the pin $k$, $k$ Fig. 5. On $w$ is placed a shaft running in journal blocks and carrying the grooved roller $u$ and the pulley $xx$, Figs. 1 and 5. To the bearer 17, Fig. 5, is fixed the loaded lever $v$, acting against the frame $w$ at $ll$. On the bearer 18, Figs. 1, 2, and 5, and the rail 16, Fig. 3 is placed a shaft carrying the grooved roller and the pulley $x$ Figs. 1, 2, and 5, with the large pulley I, Figs. 2 and 3. The rollers $u$, $u$, are grooved according to section, Fig. 6. On the blocks $ff$, Fig. 1, and $gg$, Fig. 3 is placed a shaft carrying the pulleys H and J, Figs. 2 and 3. On the rails 8, Fig. 1, and 10, Fig. 3, is placed a shaft running in journal blocks and carrying the pulley D and the crank C, Figs. 2 and 3; also the pulley E, Figs. 1 and 2. On the rails 13 and 11 is placed the blocks $l$, $l$, $l$, $l$, Figs. 1 and 2 each block having a slot cut in its end to admit a friction roller for the lines from E to pass over to pulleys F and G. A mortise is also cut in each block for a screw to pass to hold the block in its place. On the standards as shown in Fig. 3 and partly in Fig. 2 is fixed the loaded lever K by a pin at $m$, $m$. To the lever K, the arm, $n$, $n$, is fastened to carry the friction roller $oo$. The lever K plays up or down in a mortise cut in $pp$. Near the bottom of one of the standards at $qq$, Fig. 3, is fixed by a pin the lever L, to the upper end of which is fixed the pin $rr$ for the pulley $ss$ to run on. To the lever L, at L, is fastened the loaded lever $tt$, which passes through a mortise cut in $uu$, Figs. 2 and 3, which mortise must be cut so as to allow the lever $tt$ to rise and fall. The pulleys, D, H, I, J, $oo$, and $ss$, Figs. 2 and 3, are grooved to suit such belts or lines as may be chosen to drive these pulleys. The pulleys E, F, G, $x$, and $xx$, have V grooves cut on them with a small square groove cut at the bottom of each V groove to keep the V groove from clogging. A piece of spring tempered steel about the thickness and width of such as is used for the main spring of a watch is held by a button or screw on the top of each of the standards, fixed in the frame B, Figs. 2 and 4, to press on the drag which rests on the end of each of the reels shown in Figs. 1, 2, 3, and 4. The top of the standard marked $bb$ and the drag marked $ee$ with the button marked $vv$, and the spring marked $ww$, is shown full size in Fig. 9. The diameters of the several pulleys shown throughout the drawings may be taken as follows: The pulley E, Figs. 1 and 2, 21 inches; D, Figs. 2 and 3, $5\frac{1}{4}$ inches; H, Figs. 2 and 3, 21 inches; J on H at 6 inches; I, 12 inches; the cone of pulleys F, at 5, 6 and 7 inches; the cone of pulleys G the same as F; the rollers $uu$, 4 inches diameter; the pulleys $x$ and $xx$, $2\frac{1}{4}$ inches; the friction rollers $d$ and $c$, Fig. 4, one inch in diameter; the friction rollers $oo$ and $ss$, about 3 inches in diameter.

The operation of making safety fuse by my machine is as follows: Having filled the reservoir $k$ with gunpowder and filled the reels with thread, bring the threads from the reels $a$, $a$, $a$, $a$, through the holes in the reel frame A, Figs. 4, 3, 2, and 1, take the case $e$ from off the cone $f$, then pass the threads along the grooves in the cone $f$, twist the threads together and pass them through the case $e$, secure the case $e$ on the cone $f$, raise the cone $y$ from its seat in $l$, pass the twisted threads through the hole in the center of $y$, bring the threads from the reels $b$, $b$, $b$, $b$, pass them with the twisted threads from the reels $a$, $a$, $a$, $a$, through the hollow shaft L, replace the cone $y$, and secure it down to its seat in L.

The whole of the threads is then brought down between the grooved rollers $u$, $u$, adjust the grooved roller $c$ to the twisted threads by the nuts and screw at $g$, press the roller $d$ against the twisted threads by the weight $i$ on the lever $j$, open the stop cock $p$, put the reel frames in motion by driving the crank handle C. The safety fuse is then made. The fuse is afterward coated with water proof varnish to keep the powder dry.

In the machine represented by the drawings the power is applied to the crank C. This puts in motion the pulleys D and E; the pulley E drives the pulleys F and G, the pulley F drives the shaft $q$ with the frame A, the pulley G drives the hollow shaft L with the frame B in contrary direction to that of A, the pulley D drives the pulley H, attached to which is the pulley Y. This drives the pulley I, the shaft of which carries one of the grooved rollers $u$ and the pulley $x$, the pulley $x$ drives the pulley $x$, $x$ with the other grooved roller $u$. The loaded levers K and L with friction rollers are used to tighten the belts or lines on pulleys D, H, I, and J. The movable blocks $l, l, l, l,$ are used to guide and to tighten the lines from pulley E to pulleys F and G. The bell marked $o$ throughout the drawings is used to give notice being struck by the arm $n$ when the reservoir $k$ requires refilling with gunpowder.

What I claim as my invention and desire to secure by Letters Patent is—

1. The combination of the reel frame and reels with the hollow shaft, cone and case, for making the inner case of the fuse, and in combination with them the grooved rollers for compressing the inner case.

2. the combination of the reel frame and the reels and hollow shaft with the cone and case for the purpose and making and putting on the outer case of the safety fuse and in combination with them the grooved rollers for drawing off and determining the length of the fuse, the whole being constructed and operating in the manner substantially as herein described.

WILLM. LEWIS.

Witnesses:
WILLIAM HENRY LEWIS,
JOHN JOHNSON.